(12) United States Patent
Seo et al.

(10) Patent No.: US 10,999,018 B2
(45) Date of Patent: May 4, 2021

(54) METHOD FOR MULTIPLEXING ACK/NACK RESPONSE IN WIRELESS COMMUNICATION SYSTEM, AND APPARATUS THEREFOR

(71) Applicant: LG ELECTRONICS INC., Seoul (KR)

(72) Inventors: Hanbyul Seo, Seoul (KR); Suckchel Yang, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/796,577

(22) Filed: Feb. 20, 2020

(65) Prior Publication Data
US 2020/0195388 A1    Jun. 18, 2020

Related U.S. Application Data

(63) Continuation of application No. 15/558,775, filed as application No. PCT/KR2016/004093 on Apr. 20, 2016, now Pat. No. 10,587,372.
(Continued)

(51) Int. Cl.
*H04L 1/18*   (2006.01)
*H04L 1/00*   (2006.01)
(Continued)

(52) U.S. Cl.
CPC .............. *H04L 1/1861* (2013.01); *H04L 1/00* (2013.01); *H04L 1/1607* (2013.01);
(Continued)

(58) Field of Classification Search
CPC ....... H04L 1/1861; H04L 1/00; H04L 1/1607; H04L 5/0055; H04L 2001/0093; H04W 72/005
See application file for complete search history.

(56) References Cited

U.S. PATENT DOCUMENTS 10,587,372 B2    3/2020  Seo et al.
2010/0177676 A1  7/2010  Wang et al.
(Continued)

FOREIGN PATENT DOCUMENTS

KR    1020100052459    5/2010
KR    1020110036073    4/2011
(Continued)

OTHER PUBLICATIONS

PCT International Application No. PCT/KR2016/004093, Written Opinion of the International Searching Authority dated Aug. 5, 2016, 18 pages.
(Continued)

*Primary Examiner* — Robert C Scheibel
(74) *Attorney, Agent, or Firm* — Lee Hong Degerman Kang & Waimey

(57) ABSTRACT

Disclosed is a method for reporting, by a terminal, acknowledgement/negative acknowledgement (ACK/NACK) to a base station. Specifically, the method comprises the steps of: receiving, from a network, data signals for providing a plurality of broadcasting services during a preset subframe; generating, in subframe units, pieces of ACK/NACK information with respect to each of the data signals; bundling the pieces of ACK/NACK information; and reporting the bundled pieces of ACK/NACK information to the network from a single subframe.

8 Claims, 10 Drawing Sheets

Related U.S. Application Data

(60) Provisional application No. 62/150,232, filed on Apr. 20, 2015, provisional application No. 62/150,814, filed on Apr. 21, 2015, provisional application No. 62/151,964, filed on Apr. 23, 2015, provisional application No. 62/173,919, filed on Jun. 10, 2015.

(51) Int. Cl.
　　　*H04L 5/00*　　　(2006.01)
　　　*H04L 1/16*　　　(2006.01)
　　　*H04W 72/00*　　(2009.01)

(52) U.S. Cl.
　　　CPC ......... *H04L 5/0055* (2013.01); *H04W 72/005* (2013.01); *H04L 2001/0093* (2013.01)

(56) References Cited

U.S. PATENT DOCUMENTS

| | | | |
|---|---|---|---|
| 2011/0194477 A1 | 8/2011 | Damnjanovic et al. | |
| 2011/0310856 A1* | 12/2011 | Hariharan | H04L 5/14 370/336 |
| 2013/0208692 A1 | 8/2013 | Seo et al. | |
| 2013/0265963 A1* | 10/2013 | Suzuki | H04L 27/2601 370/329 |
| 2014/0044084 A1 | 2/2014 | Lee et al. | |
| 2014/0328260 A1* | 11/2014 | Papasakellariou | H04L 1/1861 370/329 |
| 2016/0094327 A1* | 3/2016 | Han | H04W 72/0413 370/329 |
| 2017/0078107 A1 | 3/2017 | Itagaki et al. | |
| 2017/0279673 A1 | 9/2017 | Itagaki et al. | |

FOREIGN PATENT DOCUMENTS

| | | |
|---|---|---|
| KR | 1020130028040 | 3/2013 |
| WO | 2013109073 | 7/2013 |

OTHER PUBLICATIONS

U.S. Appl. No. 15/558,775, Office Action dated Oct. 5, 2018, 32 pages.
U.S. Appl. No. 15/558,775, Final Office Action dated Mar. 20, 2019, 14 pages.
U.S. Appl. No. 15/558,775, Notice of Allowance dated Oct. 30, 2019, 9 pages.

\* cited by examiner (A) CONTROL-PLANE PROTOCOL STACK (B) USER-PLANE PROTOCOL STACK

METHOD FOR MULTIPLEXING ACK/NACK RESPONSE IN WIRELESS COMMUNICATION SYSTEM, AND APPARATUS THEREFOR

CROSS-REFERENCE TO RELATED APPLICATIONS

This application is a continuation of U.S. patent application Ser. No. 15/558,775, filed on Sep. 15, 2017, now U.S. Pat. No. 10,587,372, which is the National Stage filing under 35 U.S.C. 371 of International Application No. PCT/KR2016/004093, filed on Apr. 20, 2016, which claims the benefit of U.S. Provisional Application No. 62/150,232, filed on Apr. 20, 2015, 62/150,814, filed on Apr. 21, 2015, 62/151,964, filed on Apr. 23, 2015, and 62/173,919, filed on Jun. 10, 2015, the contents of which are all hereby incorporated by reference herein in their entirety.

TECHNICAL FIELD

The present invention relates to a wireless communication system, and more particularly, to a method for multiplexing acknowledgement/negative acknowledgement (ACK/NACK) of a unicast signal and ACK/NACK of a multicast signal in a wireless communication system and an apparatus therefor.

BACKGROUND ART

A structure of a 3GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE

Technical Problem

Based on the aforementioned discussion, an object of the present invention is to provide a method for multiplexing acknowledgement/negative acknowledgement (ACK/NACK) of a unicast signal and ACK/NACK of a multicast signal in a wireless communication system and an apparatus therefor.

Technical Solution

According to one aspect of the present invention, a method for reporting acknowledgement/negative acknowledgement (ACK/NACK) by a user equipment (UE) in a wireless communication system comprises the steps of receiving, from a network, data signals for providing a plurality of broadcast services for a preset subframe; generating ACK/NACK information with respect to each of the data signals in a unit of subframe; bundling the ACK/NACK information; and reporting the bundled ACK/NACK information to the network at one subframe.

In this case, the step of bundling the ACK/NACK information may include bundling the ACK/NACK information for broadcast services received at the same subframe, or may include bundling the ACK/NACK information with respect to each of the broadcast services received for the preset subframe.

Preferably, the method may further comprise the step of receiving information on a resource for reporting the bundled ACK/NACK information to the network, through a higher layer.

Also, the method may further comprise the step of receiving control signals for receiving each of the data signals in a unit of subframe, wherein each of the control signals includes an indicator of a broadcast service provided by a corresponding data signal. Additionally, the control signals include information on a sequence of the data signals provided for the preset subframe, the sequence of the data signals being defined in a unit of broadcast service.

In another aspect of the present invention, a UE in a wireless communication system comprises a wireless communication module for transmitting and receiving a signal to and from a network; and a processor for processing the signal, wherein the processor controls the wireless communication module to receive, from the network, data signals for providing a plurality of broadcast services for a preset subframe, and controls the wireless communication module to generate ACK/NACK information with respect to each of the data signals in a unit of subframe, bundle the ACK/

NACK information, and report the bundled ACK/NACK information to the network at one subframe.

In this case, the processor may bundle the ACK/NACK information for broadcast services received at the same subframe, or may bundle the ACK/NACK information with respect to each of the broadcast services received for the preset subframe.

Additionally, the processor may control the wireless communication module to receive information on a resource for reporting the bundled ACK/NACK information to the network, through a higher layer.

More preferably, the processor may control the wireless communication module to receive control signals for receiving each of the data signals in a unit of subframe, and each of the control signals may include an indicator of a broadcast service provided by a corresponding data signal. In this case, the control signals may include information on a sequence of the data signals provided for the preset subframe, the sequence of the data signals being defined in a unit of broadcast service.

Advantageous Effects

According to the embodiment of the present invention, ACK/NACK of a unicast signal and ACK/NACK of a multicast signal in a wireless communication system may be multiplexed more efficiently and then fed back.

Effects obtainable from the present invention may be non-limited by the above mentioned effect. And, other unmentioned effects can be clearly understood from the following description by those having ordinary skill in the technical field to which the present invention pertains.

BEST MODE FOR CARRYING OUT THE INVENTION

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

Figure 1:
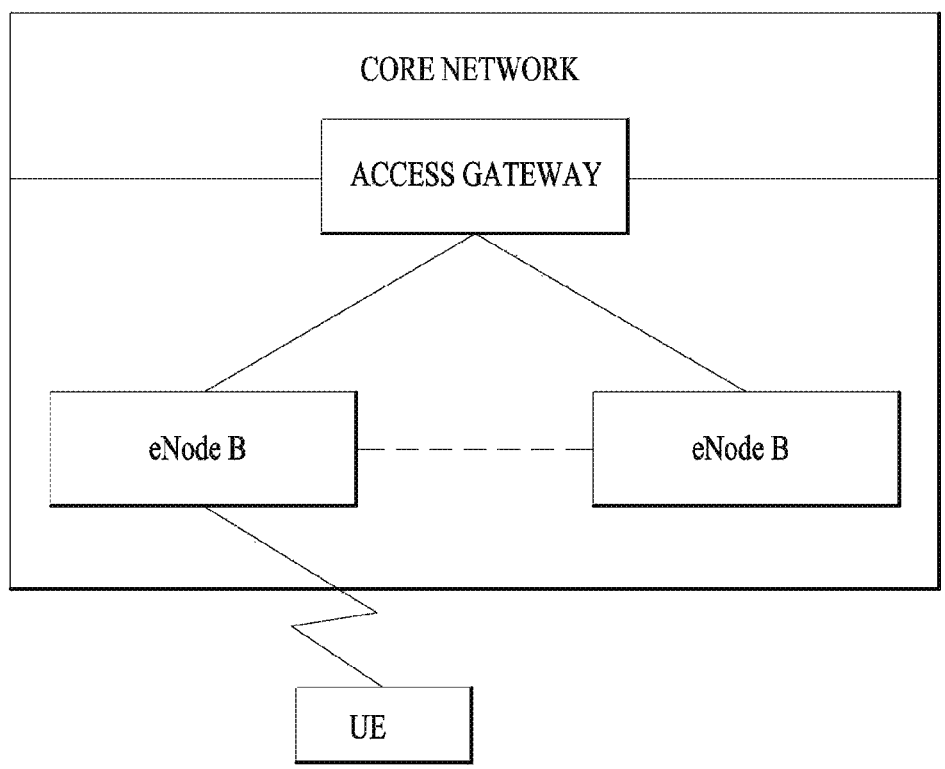
FIG. 1 is a schematic diagram of E-UMTS network structure as one example of a wireless communication system.
Figure 2:
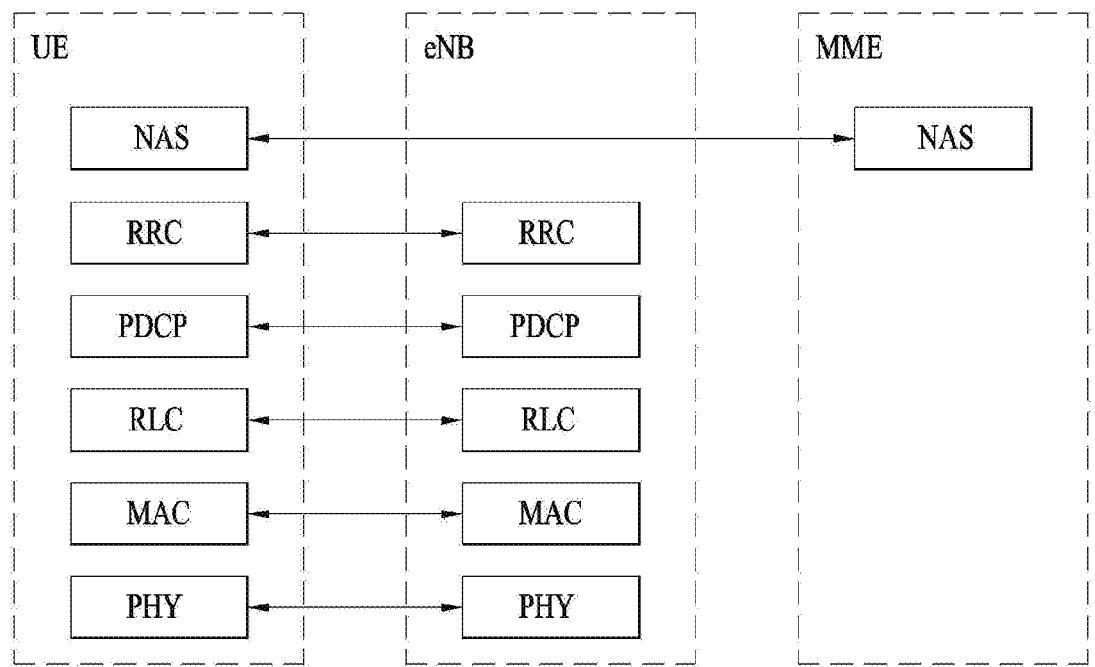
FIG. 2 is a diagram for structures of control and user planes of radio interface protocol between a 3GPP radio access network standard-based user equipment and E-UTRAN.
Figure 2:
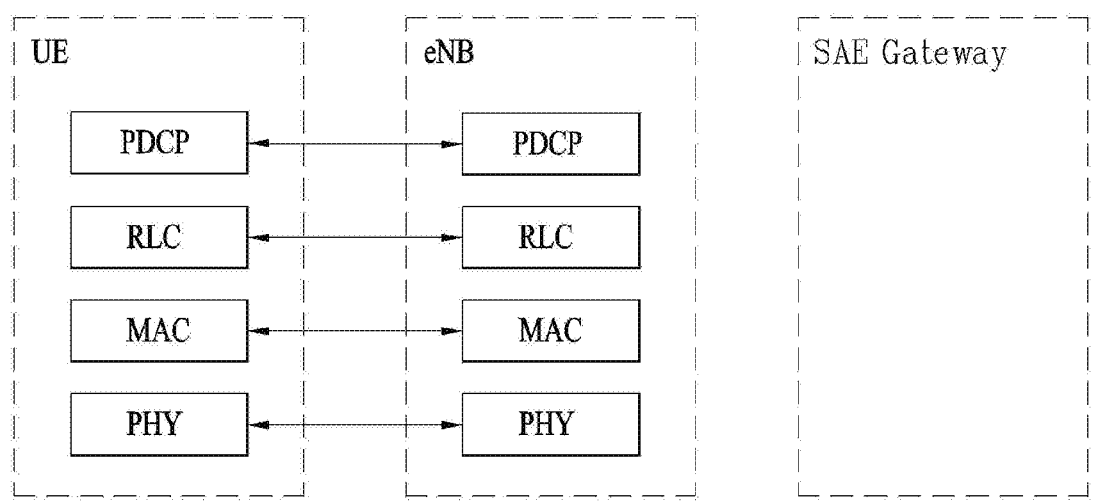

FIG. 2 is a diagram showing the structure of a control plane and a user plane of a radio interface protocol between a UE and an E-UTRAN based on the 3GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel. The physical channel uses time and frequency as radio resources. In detail, the physical channel is modulated using an Orthogonal Frequency Division Multiple Access (OFDMA) scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS)

layer located at a layer higher than the RRC layer performs a function such as session management and mobility management.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
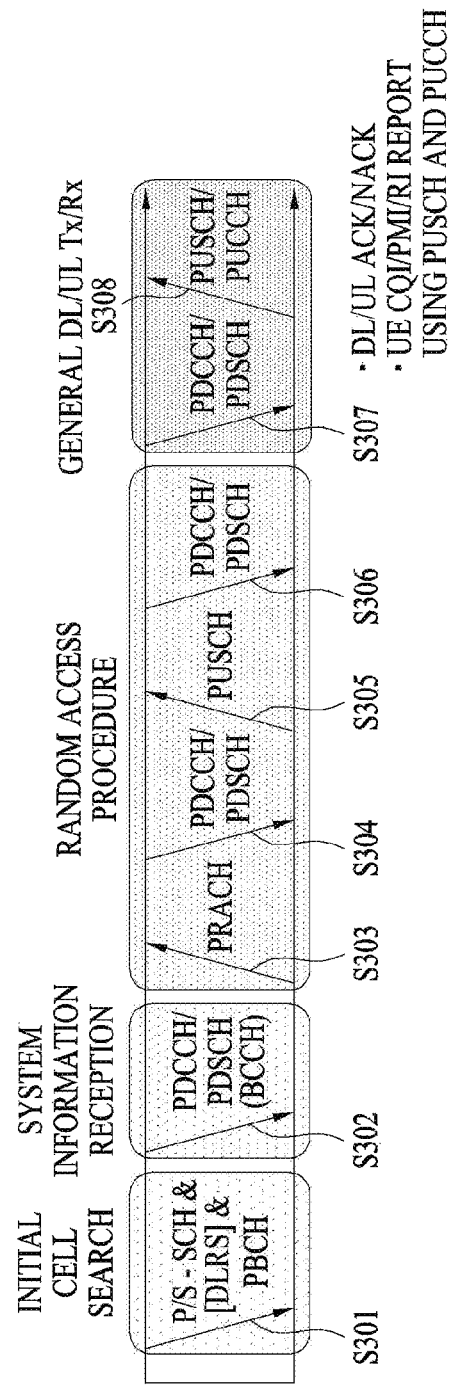
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
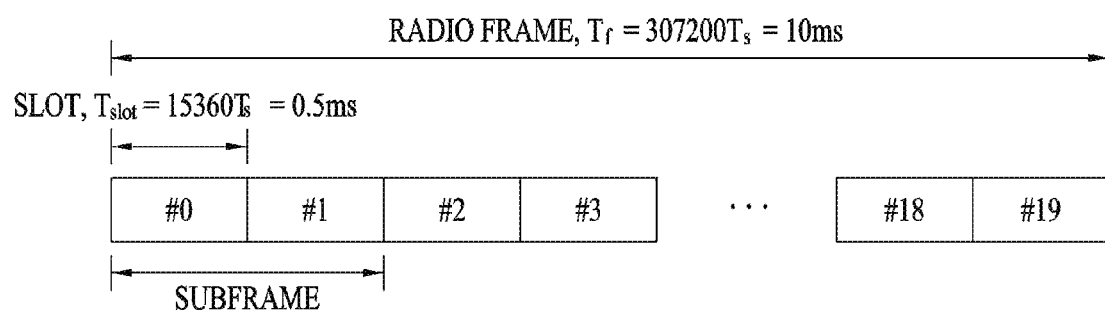
FIG. 4 is a diagram for a structure of a radio frame in LTE system.

FIG. 4 is a diagram for a structure of a radio frame in LTE system.

Referring to FIG. 4, one radio frame has a length of 10 ms ($327,200 \times T_S$) and is constructed with 10 subframes in equal size. Each of the subframes has a length of 1 ms and is constructed with two slots. Each of the slots has a length of 0.5 ms ($15,360 \times T_S$). In this case, $T_s$ indicates a sampling time and is represented as $T_s=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
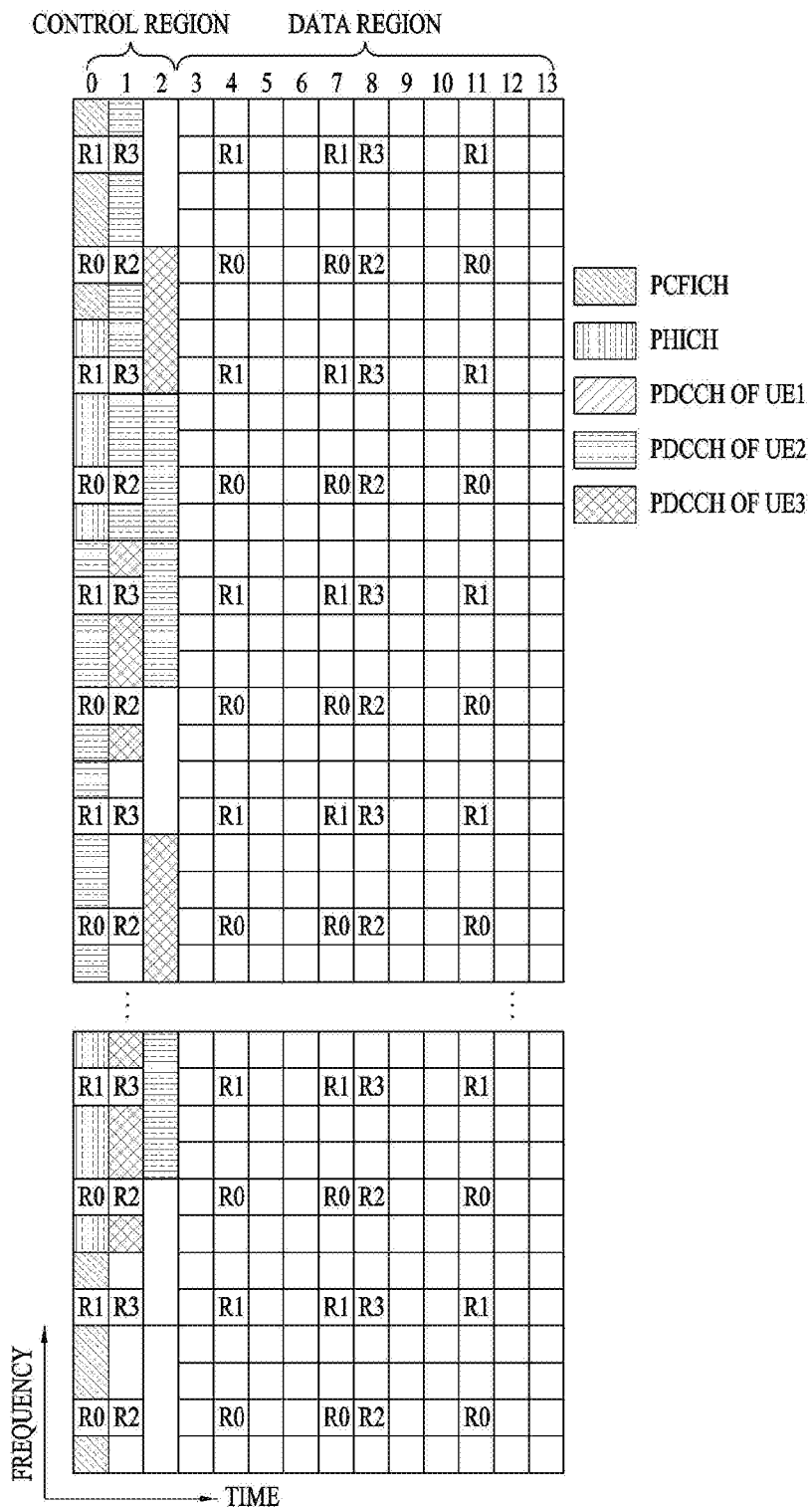
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE (Control Channel Element). The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC (Cyclic Redundancy Check) masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
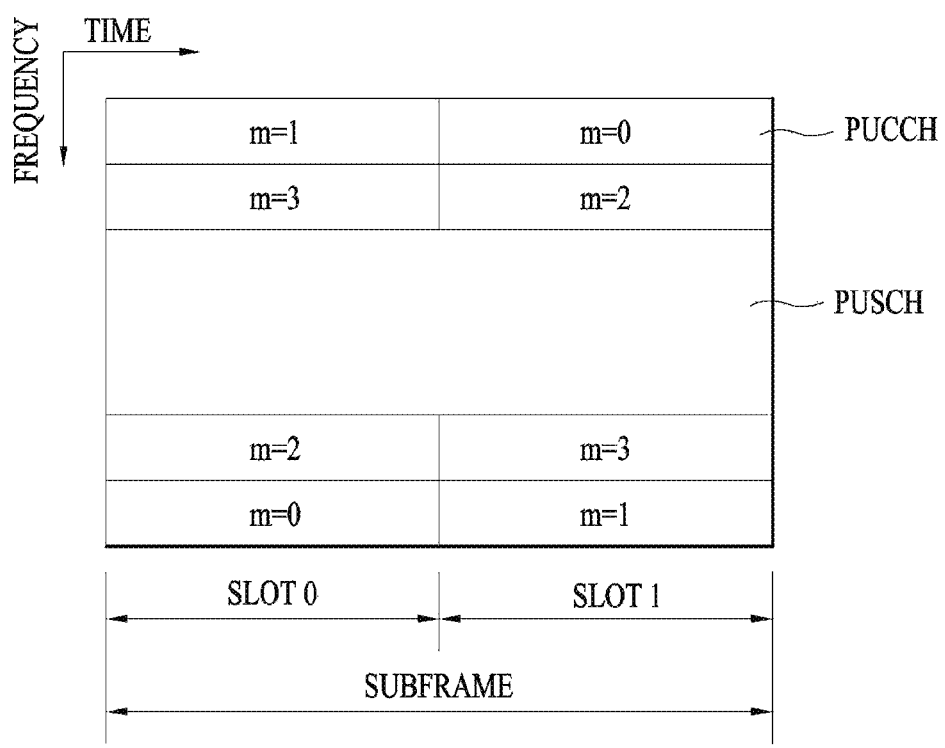
FIG. 6 is a diagram for a structure of an uplink subframe frame in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

A time within one subframe, in which a sounding reference signal can be transmitted, corresponds to the last symbol in the time domain in the subframe, and the sounding reference signal is transmitted through a data transmission band in the frequency domain. Sounding reference signals of multiple UEs, which are transmitted through the last symbol of the same subframe, can be discriminated according to frequency positions.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a DL data packet (e.g., a codeword) on a PDSCH. HARQ-ACK indicates whether the downlink data packet has been successfully received. 1-bit HARQ-ACK is transmitted in response to a single DL codeword and 2-bit HARQ-ACK is transmitted in response to two DL codewords. The HARQ-ACK response includes a positive ACK (simply, ACK), negative ACK (NACK), discontinuous transmission (DTX), or NACK/DRX. In this case, HARQ-ACK is used interchangeably with HARQ ACK/NACK and ACK/NACK.

Channel state information (CSI): CSI is feedback information for a DL channel. MIMO-related feedback information includes a rank indicator (RI) and a precoding matrix indicator (PMI). 20 bits are used per subframe.

The quantity of uplink control information that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe for which a sounding reference signal (SRS) is configured, the last SC-FDMA symbol of the subframe is excluded from the SC-FDMA symbols available for control information transmission. A reference signal is used for coherence detection of the PUCCH. The PUCCH supports various formats depending on information transmitted thereon.

Table 1 shows the mapping relationship between PUCCH formats and UCI in the LTE system.

TABLE 1

| PUCCH format | Uplink control information (UCI) |
| --- | --- |
| Format 1 | SR (Scheduling Request) (non-modulated waveform) |
| Format 1a | 1-bit HARQ ACK/NACK with/without SR |
| Format 1b | 2-bit HARQ ACK/NACK with/without SR |
| Format 2 | CSI (20 coded bits) |
| Format 2 | CSI and 1- or 2-bit HARQ ACK/NACK (20 bits) for extended CP only |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR of maximum 24 bits |

Figure 7:
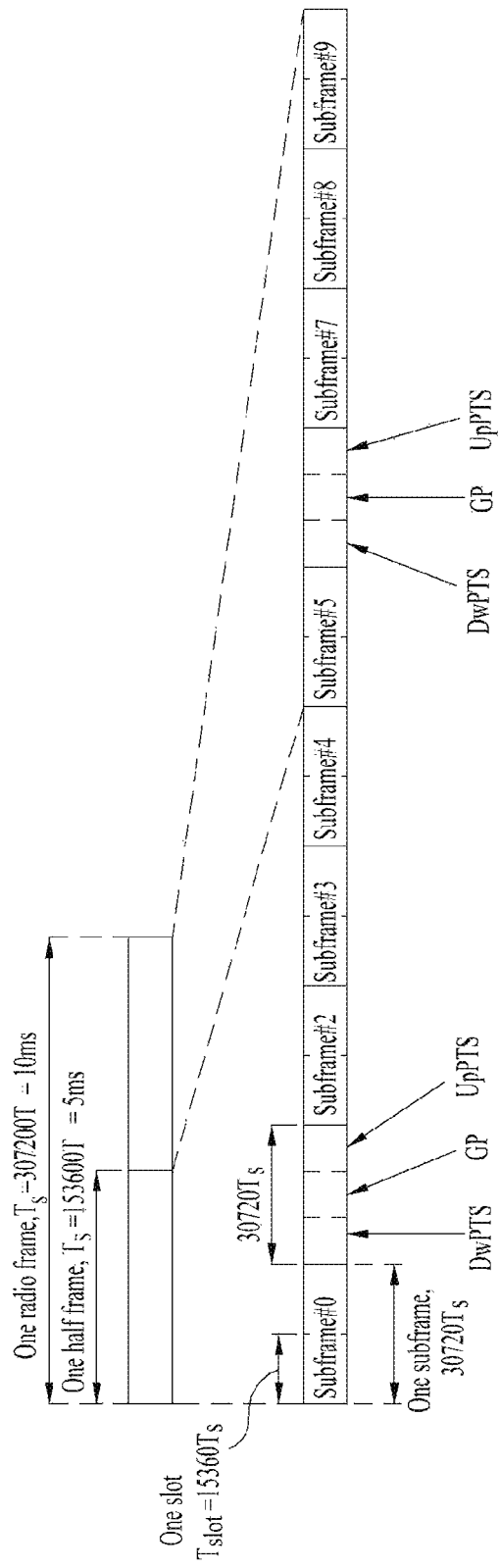
FIG. 7 illustrates a structure of a radio frame in an LTE TDD system.

FIG. 7 illustrates a structure of a radio frame in an LTE TDD system.

Referring to FIG. 7, the radio frame in the LTE TDD system includes two half frames, each of which includes four normal subframes, which includes two slots, and a special subframe that includes a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in the LTE TDD system, a UL/DL configuration is shown in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 2] above, D, U, and S refer to a downlink subframe, an uplink subframe, and the special subframe. In addition, [Table 2] also shows downlink-to-uplink switch-point periodicity in an uplink/downlink subframe configuration in each system.

Table 3 to Table 5 illustrate HARQ timelines on uplink/downlink subframe configurations of Table 2. Table 3 illustrates a set of transmission subframe indexes of PDSCH corresponding to HARQ-ACK transmitted through the special uplink subframe. For example, in case of uplink/downlink subframe configuration #1, HARQ-ACK for PDSCH, which is received at subframe #5 and subframe #6, is transmitted at subframe #2.

TABLE 3

| UL/DL configuration | 0 | 1 | 2 | 3 | 4 | 5 | 6 | 7 | 8 | 9 |
|---|---|---|---|---|---|---|---|---|---|---|
| 0 | D | S | U 6 | U 0 | U | D | S | U 1 | U | U 5 |
| 1 | D | S | U 5, 6 | U 9 | D | D | S | U 0, 1 | U 4 | D |
| 2 | D | S | U 4, 5, 6, 8 | D | D | D | S | U 0, 1, 3, 9 | D | D |
| 3 | D | S | U 1, 5, 6 | U 7, 8 | U 0, 9 | D | D | D | D | D |
| 4 | D | S | U 0, 1, 4, 5 | U 6, 7, 8, 9 | D | D | D | D | D | D |
| 5 | D | S | U 0, 1, 3, 4, 5, 6, 7, 8, 9 | D | D | D | D | D | D | D |
| 6 | D | S | U 5 | U 6 | U 9 | D | S | U 0 | U 1 | D |

Next, Table 4 illustrates transmission subframe indexes of uplink grant for scheduling PUSCH transmitted through the special uplink subframe. For example, in case of uplink/downlink subframe configuration #1, PUSCH transmitted at subframe #2 is scheduled by uplink grant transmitted at subframe #6. Particularly, uplink/downlink subframe configuration #0 of Table 4 corresponds to a special case that the number of downlink subframes is smaller than the number of uplink subframes. In this case, PUSCH at two uplink subframes may be scheduled at one downlink subframe, and PUSCH of a corresponding subframe is indicated using an uplink (UL) index field on DCI (Downlink Control Information). That is, scheduling of PUSCH at two subframes is determined using indexes in parentheses, indexes having no parenthesis, or both indexes in parentheses and indexes having no parenthesis, in accordance with the uplink index indicator.

TABLE 4

| UL/DL configuration | 0 | 1 | 2 | 3 | 4 | 5 | 6 | 7 | 8 | 9 |
|---|---|---|---|---|---|---|---|---|---|---|
| 0 | D | S | U 6, (5) | U (6) | U 0 | D | S | U 1, (0) | U (1) | U 5 |
| 1 | D | S | U 6 | U 9 | D | D | S | U 1 | U 4 | D |
| 2 | D | S | U 8 | D | D | D | S | U 3 | D | D |
| 3 | D | S | U 8 | U 9 | U 0 | D | D | D | D | D |
| 4 | D | S | U 8 | U 9 | D | D | D | D | D | D |
| 5 | D | S | U 8 | D | D | D | D | D | D | D |
| 6 | D | S | U 5 | U 6 | U 9 | D | S | U 0 | U 1 | D |

Finally, Table 5 illustrates subframe indexes to which PHICH is transmitted in response to PUSCH when the PUSCH is transmitted through the special uplink subframe. For example, uplink/downlink subframe configuration #1 means that PHICH in response to PUSCH transmitted at subframe #2 is received at subframe #6.

TABLE 5

| UL/DL configuration | 0 | 1 | 2 | 3 | 4 | 5 | 6 | 7 | 8 | 9 |
|---|---|---|---|---|---|---|---|---|---|---|
| 0 | D | S | U 6 | U 0 | U 0 | D | S | U 1 | U 5 | U 5 |
| 1 | D | S | U 6 | U 9 | D | D | S | U 1 | U 4 | D |
| 2 | D | S | U 8 | D | D | D | S | U 3 | D | D |

TABLE 5-continued

| UL/DL configuration | 0 | 1 | 2 | 3 | 4 | 5 | 6 | 7 | 8 | 9 |
|---|---|---|---|---|---|---|---|---|---|---|
| 3 | D | S | U 8 | U 9 | U 0 | D | D | D | D | D |
| 4 | D | S | U 8 | U 9 | D | D | D | D | D | D |
| 5 | D | S | U 8 | D | D | D | D | D | D | D |
| 6 | D | S | U 6 | U 9 | U 0 | D | S | U 1 | U 5 | D |

Figure 8:
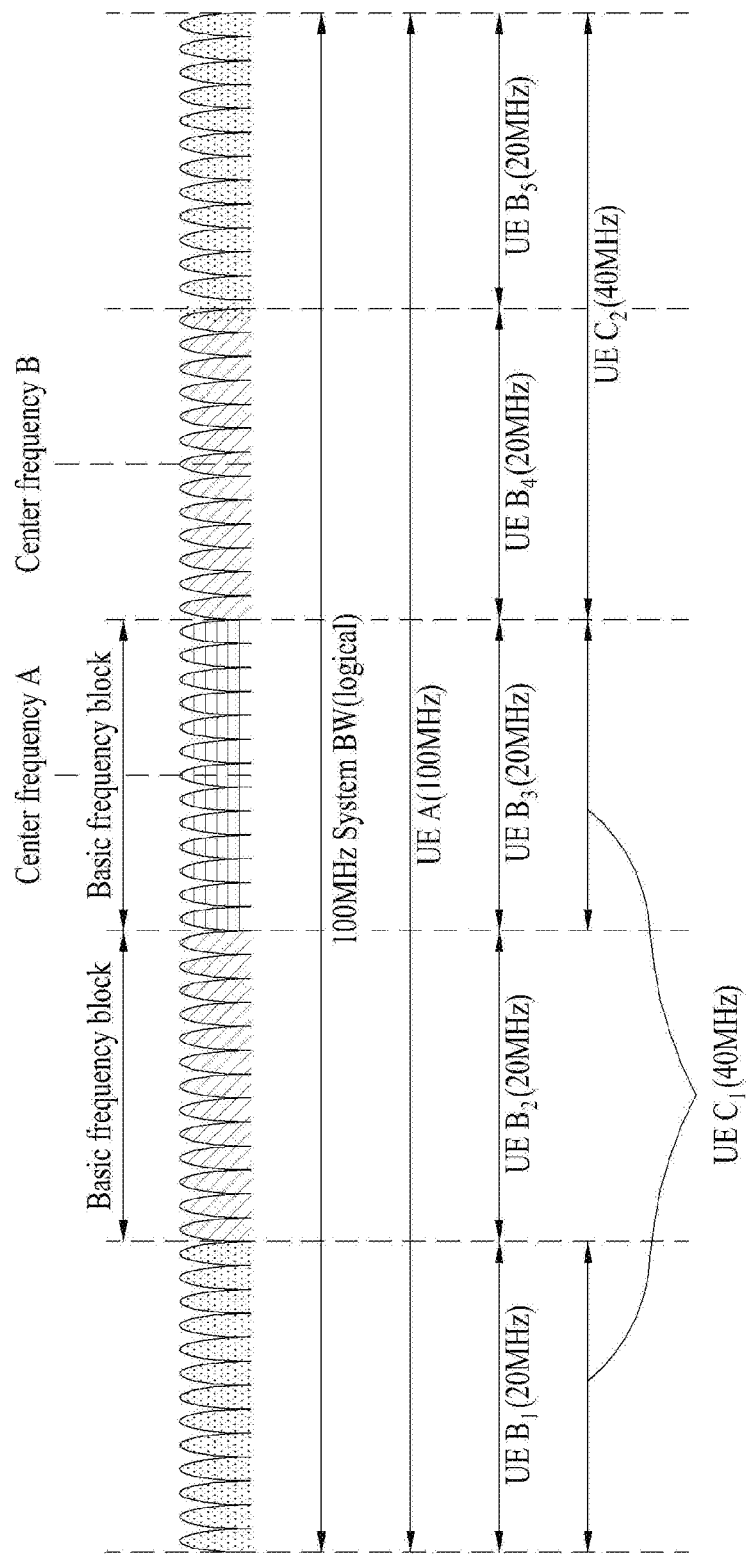
FIG. 8 is a view illustrating a concept of a carrier aggregation scheme.

Hereinafter, a carrier aggregation scheme will be described. FIG. 8 is a view illustrating concept of a carrier aggregation scheme.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will consistently be used.

Referring to FIG. 8, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 8 illustrates the case in which component carriers have the same bandwidth, the case is purely exemplary, and thus, the component carriers may have different bandwidths. In addition, although FIG. 8 illustrates the case in which the component carriers are adjacent to each other in the frequency domain, FIG. 8 are logically illustrated, and thus, the component carriers may be physically adjacent to each other or may be spaced apart from each other.

Component carriers can use different center frequencies or use one common center frequency with respect to physically adjacent component carriers. For example, in FIG. 8, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers. In this case, a method for scheduling a data channel by a control channel may be classified into a linked carrier scheduling method and a cross carrier scheduling method.

In more detail, in the linked carrier scheduling method, a control channel transmitted through a specific component carrier schedules only a data channel through the specific component carrier like in a legacy LTE system using a single component carrier.

Meanwhile, in the cross carrier scheduling method, a control channel transmitted through a primary component carrier (primary CC) using a carrier indicator field (CIF) schedules a data channel transmitted through the primary CC or other CC, that is, a secondary CC.

The present invention suggests a method for effectively coexisting broadcast and multicast transmission of same data from a network to a plurality of UEs through a downlink and unicast transmission of same data from a network to a single UE.

In this case, broadcast and multicast may be represented in such a manner that one cell transmits data in accordance with RS and format similar to those of the existing unicast transmission, or may be represented in such a manner that a plurality of cells transmit same data by using separate RS and format (especially, RS and format configured to properly combine signals from a plurality of cells) different from those of the unicast transmission. The former case may be referred to as SC-PTM (single cell point-to-multipoint), the latter case may be referred to as MBSFN (multicast and broadcast in single frequency network).

Hereinafter, a data channel transmitted for unicast from a network to a UE will be referred to as PDSCH_U, and a data channel transmitted for multicast/broadcast from a network to a UE will be referred to as PDSCH_M. Also, ACK/NACK of a UE to reception of PDSCH_U will be referred to as A/N_U, and ACK/NACK of a UE to reception of PDSCH_M will be referred to as A/N_M.

First of all, A/N report operation of the UE may be changed significantly depending on how a resource used for A/N_M is configured between UEs which together receive PDSCH_M.

First Embodiment

First of all, in the first embodiment of the present invention, a case that a resource for A/N_M transmission is UE-specific will be described. In this case, even though a plurality of UEs have received the same PDSCH_M, respective resources that transmit A/N_M may be different from each other. For example, an eNB may designate a resource, which will be used by each UE for A/N_M transmission, through a higher layer signal such as RRC.

One UE may be interested in reception of a plurality of multicast/broadcast services, and PDSCH_M corresponding to each of the plurality of multicast/broadcast services may be transmitted from the same subframe. Meanwhile, in case of a TDD system, even though the UE receives a single service, a plurality of PDSCH_Ms for the corresponding service may be received through a plurality of downlink subframes, and A/N_M for the PDSCH_Ms may be transmitted from one uplink subframe. Therefore, a method for effectively reporting a plurality of A/N_Ms is required.

First of all, the eNB may configure a plurality of A/N_M resources for one UE. This is intended to allow one UE to report A/N_M for a plurality of PDSCH_Ms as described. Therefore, the eNB may designate whether each A/N_M resource is A/N for PDSCH_M corresponding to which service received from which subframe. In this case, a service to which each PDSCH_M corresponds may be indicated through an indicator included in a control channel for scheduling PDSCH_M or a transmission parameter (e.g., a position on a search space or Cyclic Redundancy Check mask) of the corresponding control channel.

However, if A/N_M resource is allocated per PDSCH_M as described above, the A/N resource may be consumed excessively. As a method for reducing excessive consumption of the A/N resource, A/N bundling may partially be applied. In this case, A/N bundling means an operation for compressing a series of A/Ns to one A/N by performing bundling through a logical AND operation. If all of A/Ns which are subjected to bundling are ACK, ACK is reported, and if any one of A/Ns which are subjected to bundling is NACK, NACK is reported. Generally, in the multicast, link adaptation is performed for a UE which has the worst channel state within a cell. Therefore, since most of UEs may successfully receive PDSCH_M, throughput degradation may be restrictive.

In this case, partial application of A/N bundling means that a UE divides all A/N_Ms reported at one uplink subframe into one or more X groups and applies A/N bundling to each group to finally report X bundled A/Ns. In this case, as methods for grouping bundling, the following methods or their combination may be provided.

Bundling is performed for A/Ns for PDSCH_M received at the same subframe or the same subframe subset. In more detail, if a UE is subjected to a poor channel state at one subframe, since it is likely that an error occurs in PDSCH_M transmitted from the same subframe together with the UE, the PDSCH_M may be bundled together with the UE.

Bundling is performed for A/Ns for PDSCH_M corresponding the same multicast/broadcast service or service subset. Since the same service is received from the same UE set, it is preferable that link adaptation is performed together with bundling.

If it is not likely to simultaneously transmit PDSCH_M for specific services at a specific time, or if it is not likely to transmit PDSCH_M of the same service from neighboring subframes, PDSCH_Ms corresponding to a plurality of subframes and/or a plurality of services may share a single A/N_M resource.

Meanwhile, the UE may fail to receive PDCCH (or EPDCCH) for scheduling PDSCH_M. At this time, the UE fails to identify how many PDSCH_Ms are used for its A/N_M. However, if the eNB and the UE do not know the number of targets of A/N_M exactly, they may fail to receive a feedback signal normally.

For example, it is assumed that the eNB transmits 4 PDSCH_Ms and desires to receive A/N_M for the 4 PDSCH_Ms. In this case, if the UE has missed scheduling of the second A/N_M, the UE may report A/N of 3 bits. However, since the eNB expects A/N of 4 bits, a problem occurs in that transmission and reception is not performed normally. To solve this problem, in case of unicast, a downlink assignment index (DAI) field is included in PDCCH (or EPDCCH) for scheduling to designate a sequence of the corresponding PDSCH. In case of multicast, since several UEs different from one another simultaneously receive PDSCH_M and also attempt to receive a set of different PDSCH_Ms, DAI cannot be included in the PDCCH (or EPDCCH).

To solve this, it is suggested that DAI is not used for PDSCH_M and each A/N_M is transmitted from a previously determined position, and if scheduling PDCCH (or EPDCCH) for PDSCH_M corresponding to a specific A/N_M position is not received, a UE is operated to simply transmit NACK (or separate signal).

For example, if one UE reports A/N for two downlink subframes at one uplink subframe in a state that the UE receives two services, the UE reports A/N_M of maximum 4 bits. If A/N_M of maximum 4 bits is reported using PUCCH format 3, the UE may always generate A/N of 4 bits, wherein the first bit may be fixed to correspond to the first service of the first downlink subframe, the second bit may be fixed to correspond to the second service of the first downlink subframe, the third bit may be fixed to correspond to the first service of the second downlink subframe, and the fourth bit may be fixed to correspond to the second service of the second downlink subframe. If PDCCH (or EPDCCH) for scheduling PDSCH_M corresponding to a specific service at a specific subframe is not received, the corresponding bit is set to a state corresponding to NACK or DTX.

Alternatively, DAI is used even for PDSCH_M, and since different UEs may be interested in different types of multicast services, DAI used for PDSCH_M may be used to indicate PDSCH_M position within the same multicast service. As a result, if one UE receives a plurality of multicast services, different PDSCH_Ms may be received with the same DAI value.

As described above, a service to which each PDSCH_M corresponds may be provided through an indicator included in a control channel for scheduling PDSCH_M or a transmission parameter (e.g., position on a search space or Cyclic Redundancy Check mask) of the corresponding control channel. Alternatively, the UE may identify PDSCH_M position of the corresponding service through a series of counters included in a header of PDSCH_M. Through this procedure, when a control channel for some of PDSCH_Ms is not received in a state that a series of PDSCH_Ms are received, the UE may identify this and take a proper action, for example, process the corresponding A/N_M as DTX.

Hereinafter, a method for transmitting A/N_U and A/N_M through a PUCCH format 3 will be described.

First of all, it is assumed that one of PDSCH_U and PDSCH_M is scheduled through one subframe. Supposing that multicast scheduling is accepted through maximum N (=<M) subframes within a bundling window of M subframes and a UE receives only one PDSCH_M at one subframe, A/N_U and A/N_M may be transmitted together through the following methods.

i) The eNB allocates N explicit PUCCH format 1 resources corresponding to PDSCH_M through RRC signaling.

ii) Afterwards, if DAI=1 and/or SPS (semi-persistent scheduling) PDSCCH and/or PDSCH_M is only received, the UE transmits only a corresponding A/N through a channel selection based PUCCH format 1b (that is, fallback). In this case, a channel selection candidate PUCCH format 1b resource may include an implicit PUCCH resource linked to PDCCH (or EPDCCH) that includes DAI=1, an explicit PUCCH resource allocated for A/N transmission corresponding to SPS PDSCH, and an explicit PUCCH resource allocated to correspond to PDSCH_M.

iii) Also, if DAI>1 is received, (even though PDSCH_M is received), the UE transmits A/N payload corresponding to a total of M subfames through a PUCCH format 3 resource indicated by an ACK/NACK resource indicator (ARI) included in PDCCH (or EPDCCH) for scheduling PDSCH_U. In this case, the corresponding A/N payload may be configured by combination of A/N corresponding to PDSCH_U and PDSCH_M.

iv) If A/N feedback for multicast/broadcast is set, A/N bits on the PUCCH format 3 payload and channel selection mapping are arranged in the order of subframe index. This arrangement is applied to A/N_U, and in view of A/N_U, an operation different from the existing operation that follows arrangement in the order of DAI is performed. This is intended to fix the position of A/N_M even in a state that DTX for PDSCH_U is generated.

v) If PDCCH (or EPDCCH) for scheduling PDSCH_M at a subframe for which SPS PDSCH transmission is reserved is detected, the UE may be operated in a state that the UE regards that the corresponding PDSCH_M has been scheduled by overriding SPS PDSCH (that is, there is no SPS PDSCH transmission).

vi) In case of N-bit corresponding to multicast A/N, if multicast simultaneous scheduling is accepted to reach maximum L through one subframe, the N-bit may be extended to L×N bits.

Next, it is assumed that simultaneous scheduling for PDSCH_U and one or a plurality of PDSCH_Ms is accepted through one subframe. In this case, supposing that PDSCH_M scheduling through maximum N (=<M) subframes within a bundling window of M subframes is allowed and a UE receives only one PDSCH_M at one subframe, A/N_U and A/N_M may be transmitted together through the following methods.

a) The eNB separately allocates PUCCH format 3 resources (hereinafter, mc-PF3) corresponding to PDSCH_M through RRC signaling.

b) If PDSCH_M and DAI=1 and/or SPS PDSCCH are only received, the UE transmits corresponding (N-bit+2-bit) A/N to mc-PF3. However, if DAI=1 and/or SPS PDSCH is only received, the UE falls back to channel selection like the existing case.

c) If DAI>1 is received, the UE transmits all A/Ns to a PF3 resource (hereinafter, uc-PF3) indicated by an ARI included in PDCCH (or EPDCCH) for scheduling PDSCH_U, (regardless of multicast reception). In this case, all A/Ns are configured by M+N bit size including N-bit corresponding to multicast A/N and M-bit corresponding to unicast A/N.

d) Also, the A/N bits are arranged in the order of DAI value like the existing case in case of unicast M-bit within PUCCH format 3 for unicast A/N, and are arranged in the order of subframe index in case of multicast N-bit within PUCCH format 3 for unicast A/N and PUCCH format 3 for multicast A/N.

e) In case of N-bit corresponding to multicast A/N, if multicast simultaneous scheduling is accepted to reach maximum L through one subframe, the N-bit may be extended to L×N bits.

Meanwhile, if the aforementioned operation is performed, a series of A/N_U and A/N_M are together transmitted to PUCCH. In the PUCCH format 3, channel coding is applied to bit streams of A/N, and as a result, the coded bits are transmitted through the allocated PUCCH format 3 resource. Generally, it is characterized in that bits located at the front of the bit streams have greater channel coding effect.

In most cases, since A/N_U is information transmitted by a single UE only, if an error occurs in A/N of the corresponding UE, an error necessarily occurs during HARQ process. On the contrary, since A/N_M is information transmitted by a plurality of UEs, even though an error occurs in A/N of one UE, an error may not occur during HARQ process in case of A/N of another UE. For example, it is assumed that two UEs receive the same PDSCH_M. In this case, if an error occurs in A/N of one UE in a state that the two UEs have failed in reception, the eNB identifies that there is at least one UE which has failed in reception of PDSCH_M, on the basis of A/N of the other UE, and performs retransmission.

Therefore, in configuration of A/N bit streams for transmission in the PUCCH format 3, it is preferable that A/N_U is first arranged and then A/N_M is arranged. This relative arrangement sequence between A/N_U bits and A/N_M bits (on all A/N payloads) and A/N bit arrangement sequence in the above-described A/N_U or A/N_M may equally be applied to even the case that A/N_U and/or A/N_M are transmitted to PUSCH by piggyback.

Alternatively, if multicast includes information to be delivered at very high probability, it is preferable that A/N_M is first arranged and then A/N_U is arranged. Particularly, if maximum number of A/N_M bits are generated as a counter such as DAI is not applied to A/N_M, it is advantageous that a start position of A/N_U is always maintained.

On the other hand, the PUCCH format 3 transmits a plurality of A/N bits effectively but consumes more resources than channel selection or A/N bundling. Therefore, in case of a UE having no capability capable of performing CA (carrier aggregation), since many bits are not required to be transmitted through PDSCH_U only in the range that the PUCCH format 3 is required, the UE does not need to support the PUCCH format 3. However, a UE having a capability capable of receiving PDSCH_M and transmitting A/N in response to the PDSCH_M, especially a UE having a capability capable of receiving PDSCH_M together with PDSCH_U and transmitting A/N_U and A/N_M together may be prescribed to always support the PUCCH format 3 because a status that the UE transmits many A/N bits may occur frequently even though the UE has no CA capability.

Hereinafter, a method for transmitting A/N_U and A/N_M together through channel selection will be described.

It is assumed that scheduling for one of PDSCH_U and PDSCH_M is accepted through one subframe. In this case, supposing that multicast scheduling is accepted through maximum N (=<M) subframes within a bundling window of M subframes and a UE receives only one PDSCH_M at one subframe, the UE may transmit A/N_U and A/N_M together through the following methods. The following methods may be applied to even the case that PDSCH_U and PDSCH_M transmitted from the same subframe are transmitted through ACK/NACK bundling.

A) The eNB allocates N explicit PUCCH format 1 resources corresponding to PDSCH_M through RRC signaling.

B) Afterwards, the UE transmits A/N corresponding to PDSCH reception at each subframe through a channel selection based PUCCH format 1b. In this case, a channel selection candidate PUCCH format 1b resource may include an implicit PUCCH resource linked to PDCCH (or EPDCCH) corresponding to PDSCH_U, an explicit PUCCH resource allocated for A/N transmission corresponding to SPS PDSCH, and an explicit PUCCH resource allocated to correspond to PDSCH_M.

C) If A/N feedback for multicast/broadcast is set, A/N bits on A/N state mapping for the channel selection are arranged in the order of subframe index. This arrangement is applied to A/N_U, and in view of A/N_U, an operation different from the existing operation that follows arrangement in the order of DAI is performed. This is intended to fix the position of A/N_M even in a state that DTX for PDSCH_U is generated.

D) If PDCCH (or EPDCCH) for scheduling PDSCH_M at a subframe for which SPS PDSCH transmission is reserved is detected, the UE may be operated in a state that the UE regards that the corresponding PDSCH_M has been scheduled by overriding SPS PDSCH (that is, there is no SPS PDSCH transmission).

E) In case of N-bit corresponding to multicast A/N, if multicast simultaneous scheduling is accepted to reach maximum L through one subframe, the N-bit may be extended to L×N bits.

Meanwhile, it is assumed that simultaneous scheduling and reception of PDSCH_U and PDSCH_M are available through one subframe. In this case, a different A/N transmission scheme may be applied to each of the case that PDSCH_U is only received and the case that PDSCH_U and PDSCH_M are received together. In more detail, A/N transmission scheme configured for the existing non-CA status may be applied to the case that PDSCH_U is only received, and A/N transmission scheme configured for a CA status may be applied to the case that PDSCH_M is received. If PDSCH_U and PDSCH_M are received, each of PDSCH_U and PDSCH_M may be regarded as PDSCH received through Pcell and Scell in a CA status (in view of A/N bit mapping and PUCCH resource allocation). More detailed description will be given.

First of all, if a channel selection scheme is applied to the FDD system, A/N is transmitted through PUCCH format 1a/1b in the same manner as the existing non-CA status when PDSCH_U is only received, and if PDSCH_U and PDSCH_M are received together, A/N is transmitted based on channel selection used for a CA status. In this case, Pcell and Scell in an A/N state mapping table for channel selection may be replaced with PDSCH_U and PDSCH_M, respectively. At this time, PUCCH resource corresponding to PDSCH_U may be allocated as implicit PUCCH resource linked to DL grant transmission resource, and PUCCH resource corresponding to PDSCH_M may be configured through RRC signaling.

If the PUCCH format 3 used for CA is applied to the FDD system, A/N is transmitted through PUCCH format 1a/1b in the same manner as the existing non-CA status when PDSCH_U is only received, and if PDSCH_U and PDSCH_M are received together, A/N is transmitted through the PUCCH format 3 used for a CA status. In this case, A/N bits corresponding to Pcell and Scell on payload of the PUCCH format 3 may be replaced with A/N bits corresponding to PDSCH_U and PDSCH_M, respectively.

Next, if channel selection used for CA is applied to the TDD system, A/N is transmitted based on channel selection or HARQ-ACK bundling used for the non-CA status when PDSCH_U is only received, and if PDSCH_U and PDSCH_M are received together, A/N is transmitted based on channel selection used for a CA status. In this case, Pcell and Scell in an A/N state mapping table for channel selection for CA may be replaced with PDSCH_U and PDSCH_M, respectively. At this time, PUCCH resource corresponding to PDSCH_U may be allocated as implicit PUCCH resource linked to DL grant transmission resource, and PUCCH resource corresponding to PDSCH_M may be configured through RRC signaling.

Finally, if the PUCCH format 3 used for CA is applied to the TDD system, A/N is transmitted based on channel selection or HARQ-ACK bundling used for the non-CA status when PDSCH_U is only received, and if PDSCH_U and PDSCH_M are received together, A/N is transmitted through the PUCCH format 3 used for a CA status. In this case, A/N bits corresponding to Pcell and Scell on payload of the PUCCH format 3 may be replaced with A/N bits corresponding to PDSCH_U and PDSCH_M, respectively.

Second Embodiment

Next, it is assumed that A/N_M resource is common for UEs in the second embodiment.

As a method for forming A/N_M resource to be common for UEs, A/N_M resource may be designated for a plurality of unspecified UEs through a broadcast control signal such as SIB. Alternatively, if A/N resource linked to PDCCH (or EPDCCH) for scheduling PDSCH_M is used, all UEs which receive the corresponding scheduling PDCCH (or EPDCCH) share the same resource.

In this case, if the UE receives PDSCH_M, the UE should perform transmission from the A/N_M resource at an uplink subframe to which the corresponding A/N_M is transmitted. As a result, transmission of A/N_U cannot be performed at the corresponding uplink subframe. Particularly, if the UE fails to simultaneously transmit two uplink channels, a problem occurs in that A/N_U is lost. To solve this problem, the uplink subframe is divided into two subsets, wherein the UE may be operated to report only A/N_U at one subset and report only A/N_M at the other subset. To this end, A/N timing for PDSCH_U may be controlled differently from A/N timing for PDSCH_M.

When one UE may transmit two channels simultaneously, the UE may transmit A/N_U and A/N_M simultaneously. In this case, if a sum of powers required for two transmissions exceeds a maximum transmission power available from the corresponding UE, the transmission power should be reduced. In this case, although the power may be reduced equally from both channels, a priority may be given to a specific channel (for example, a priority is given to A/N_U for PDSCH_U that requires more resources or a priority is given to A/N_M for PDSCH_M that delivers an urgent message), whereby the power may first be allocated to the channel having the priority and the remaining power may be allocated to the other channel.

Alternatively, if the sum of powers required for two transmissions exceeds the maximum transmission power, the power may be divided into a power of A/N_U and a power of A/N_M in accordance with a ratio which is previously determined. In this case, the ratio may be varied depending on the number of bits transmitted from each of A/N_U and A/N_M. That is, when more bits are transmitted to A/N_U (or A/N_M) as compared with that the same number of bits are transmitted to each of A/N_U and A/N_M, the grater ratio may be allocated to A/N_U (or A/N_M).

Meanwhile, it may be difficult for one UE to transmit a plurality of A/N_M at one uplink subframe. This is because that at least some of UEs may transmit only one channel at one uplink subframe as described above. Although the existing A/N_U could transmit a plurality of A/Ns to one channel through channel selection or PUCCH format 3, in a state that A/N_M resource is shared by a plurality of UEs, services in which the respective UEs are interested are different from each other, whereby such application becomes difficult.

Under the circumstances, the UE may basically be operated to transmit A/N_M for only PDSCH_M in which a decoding error occurs. For example, if the UE reports A/N_M1 and A/N_M2 for PDSCH_M1 and PDSCH_M2 at a specific uplink subframe, PDSCH_M1 may be successfully received but PDSCH_M2 may be failed in reception. In this case, the UE transmits only NACK for A/N_M2. This is intended to allow the eNB to attempt to perform retransmission by giving a priority to failure in reception.

Meanwhile, if the UE fails in reception of a plurality of PDSCH_Ms, a problem still occurs. In the above example, if the UE fails in reception of PDSCH_M1 and PDSCH_M2, how A/N should be transmitted should be determined. In this case, methods of the followings (1) to (4) and their combination may be considered.

(1) If a priority is given between PDSCH_Ms and reception of the plurality of PDSCH_Ms is failed, A/N may be transmitted through A/N_M resource corresponding to PDSCH_M having the highest priority among the PDSCH_Ms of which reception is failed. For example, the priority may be given in accordance with multicast/broadcast services.

(2) Each A/N resource may be allocated to combination of reception success/failure between the PDSCH_Ms, and the UE transmits A/N resource corresponding to combination of reception success/failure of PDSCH_M in view of its aspect. For example, three A/N resources of resources A, B and C may be configured and respective combinations (PDSCH_M1 success, PDSCH_M2 failure), (PDSCH_M1 failure, PDSCH_M2 success), (PDSCH_M1 failure, PDSCH_M2 failure) may be linked with one another. Particularly, at least one PDSCH_M from the respective combinations may be marked as failure. This means that the UE which has successfully received all of PDSCH_Ms does not use A/N resource.

(3) Also, each A/N resource may be allocated to combination of ACK/NACK/DTX between the PDSCH_Ms, and the UE may transmit A/N resource corresponding to combination of ACK/NACK/DTX of PDSCH_M in view of its aspect. In this case, DTX may mean detection failure of PDCCH (or EPDCCH) corresponding to PDSCH_M. Particularly, a method for identifying whether each of N PDSCH_Ms is ACK ("A"), or NACK or DTX ("N/D") and allocating/transmitting different A/N resources in accordance with combination of ACK/NACK/DTX may be considered. For example, supposing that N=2, different A/N resources may be allocated/transmitted depending on whether HARQ-ACK combination corresponding to (PDSCH_M1, PDSCHM_M2) corresponds to any one of (A, A), (A, N/D), (N/D, A), (N/D, N/D). In this case, if HARQ-ACKs for N PDSCH_Ms are all "ACK" or "DTX", A/N resource allocation/transmission may not be performed, and if combination is configured by ACK and DTX, the corresponding A/N resource may be transmitted or transmission may be omitted (that is, UE may transmit A/N resource only if at least one NACK is included in the combination.

Also, the above-described methods may be applied to N PDSCH_Ms received simultaneously through one subframe or N PDSCH_Ms received through N subframes (that is, the status that one PDSCH_M is received through one subframe), and may similarly be applied to N×M PDSCH_Ms received through N subframes (that is, the status that M PDSCH_Ms are simultaneously received through one subframe).

(4) Finally, A/N resource used if a predetermined number of PDSCH_Ms or more are failed in reception may be configured separately. For example, a separate A/N resource X may be configured separately from a resource corresponding to PDSCH_M1 and PDSCH_M2, and a UE which has failed in reception of the two PDSCH_Ms uses this separate resource. Particularly, the separate resource may be used if failure in a predetermined number of PDSCH_Ms or more attempted to be received by the UE occurs, regardless of PDSCH_M of which reception has been failed. If the eNB receives NACK from this resource, the eNB may know that at least one of all multicast/broadcast UEs of a corresponding cell has failed in reception of a plurality of PDSCH_Ms. However, since the eNB cannot know which UE has received which PDSCH_M, the eNB may be operated to retransmit all of possible PDSCH_Ms. Particularly, this method is advantageous when the number of PDSCH_Ms for report of HARQ-ACK at one subframe is increased. For example, if a report for a total of N PDSCH_Ms should be performed, and if one PDSCH_M is failed, N A/N resources for report of each PDSCH_M and one A/N resource for report when two or more PDSCH_Ms are failed are required, whereby an operation may be performed by a total of N+1 resources.

Meanwhile, if the UE fails to receive PDCCH (or EPDCCH) for scheduling a specific PDSCH_M, the corresponding PDSCH_M corresponds to a status which corresponds to neither ACK nor NACK. This status may be referred to as DTX. In case of unicast, DTX may be processed in the same manner as NACK in view of the fact that data reception has been failed. Particularly, PDSCH_U to which specific scheduling for transmission to the corresponding UE included in PDCCH (or EPDCCH) corresponds may be notified, whereby the UE may recognize DTX.

For example, if the UE receives scheduling of DAI=3 without receiving scheduling of DAI=2 after receiving scheduling of DAI=1, the UE may know that PDSCH_U corresponding to DAI=2 is DTX. However, in case of multicast/broadcast, such DAI based DTX operation may become difficult, especially when A/N resource common for UEs is used. At this time, DTX may be processed in the same manner as ACK. For example, when A/N information corresponding to specific PDSCH_M is generated, the same information (e.g., corresponding bit is set to 1) is generated for the corresponding PDSCH_M in case of DTX and ACK, and information (e.g., corresponding bit is set to 0) different from that of DTX and ACK is generated in case of NACK.

However, DAI may be introduced even for multicast/unicast. At this time, DAI count should be operated to be effective only between PDSCH_Ms corresponding to the same multicast/broadcast service. That is, DAIS corresponding to different services are counted independently from each other. At this time, if sets (which may be referred to as multicast cluster) of cells for transmitting multicast/broadcast are different from each other, it may be regarded that multicast/broadcast services transmitted from the sets of the respective cells are different from each other. Alternatively, instead of transmitting the DAIS to PDCCH (or EPDCCH), the eNB may notify the UE how many times PDSCH_M corresponding to a random service has been transmitted for a certain time period, through a higher layer signal, and the UE that has received the notification may identify how many PDSCH_Ms have been missed.

Figure 9:
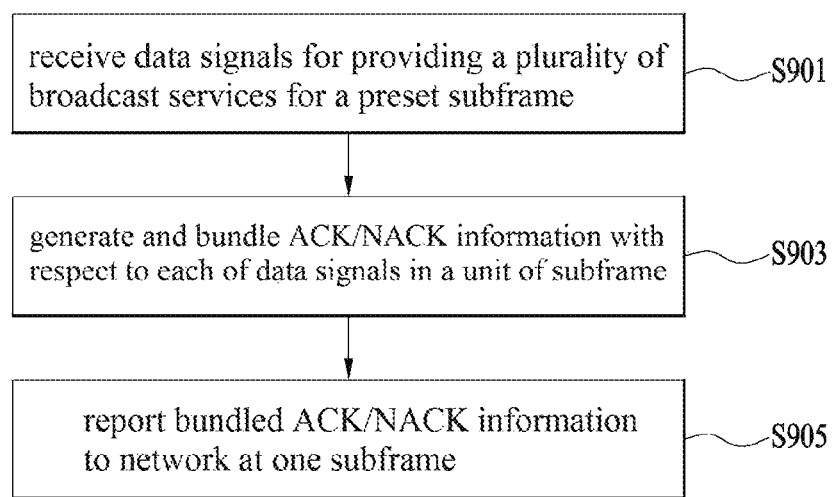
FIG. 9 is a flow chart illustrating a method for feeding back ACK/NACK from a UE in accordance with the embodiment of the present invention.

FIG. 9 is a flow chart illustrating a method for feeding back ACK/NACK from a UE in accordance with the embodiment of the present invention. Particularly, in FIG. 9, it is assumed that the UE receives a plurality of PDSCH_Ms and reports ACK/NACK for the received PDSCH_Ms through bundling.

Referring to FIG. 9, in step 901, the UE receives data signals for providing a plurality of broadcast services from a network for a preset subframe. That is, the UE is interested in reception of a plurality of multicast/broadcast services, and receives a plurality of PDSCH_Ms respectively corresponding to the plurality of multicast/broadcast services through a plurality of downlink subframes.

Afterwards, in step 903, the UE generates ACK/NACK information for each of the data signals in a unit of subframe, and performs bundling for the ACK/NACK information. That is, A/N bundling is partially applied to A/N_M resource per PDSCH_M.

In this case, the ACK/NACK information for the broadcast services received at the same subframe may be subjected to bundling, that is, A/Ns for PDSCH_M received at the same subframe may be subjected to bundling. Alternatively, the ACK/NACK information may be subjected to bundling with respect to each of the broadcast services received for the preset subframe, that is, A/Ns for PDSCH_M corresponding to the same multicast/broadcast service may be subjected to bundling.

Additionally, the UE may receive control signals for receiving each of the data signals in a unit of subframe. In this case, the control signals include information on a sequence of the data signals provided for the preset subframe, wherein the sequence of the data signals is defined in the unit of broadcast service. That is, DAI may be used for PDSCH_M, and may indicate a position of the PDSCH_M within the same multicast service.

Finally, in step 905, the UE may report the bundled ACK/NACK information to the network at one subframe.

Figure 10:
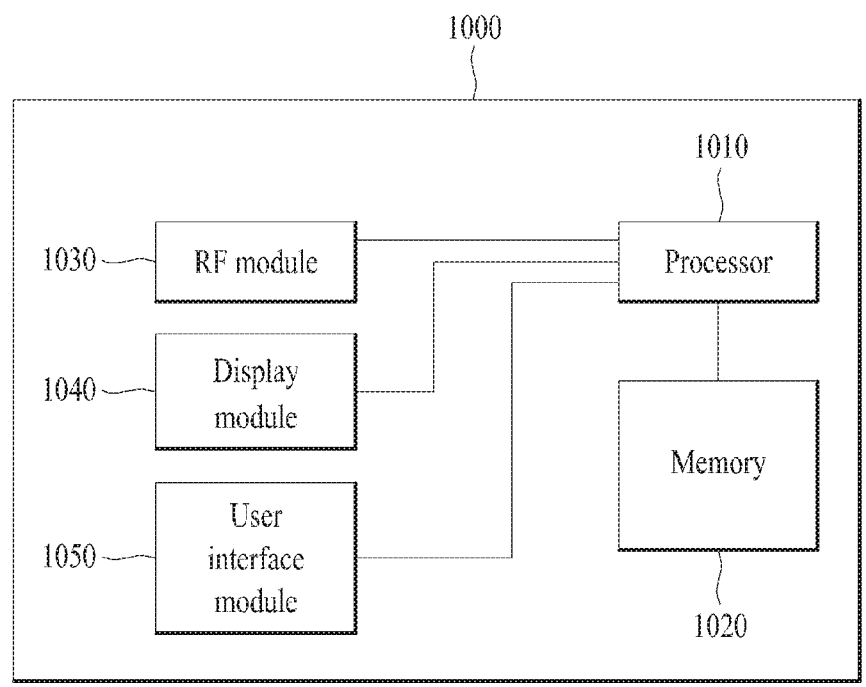
FIG. 10 is a block diagram for an example of a communication device according to one embodiment of the present invention.

FIG. 10 is a block diagram for an example of a communication device according to one embodiment of the present invention.

Referring to FIG. 10, a communication device 1000 may include a processor 1010, a memory 1020, an RF module 1030, a display module 1040, and a user interface module 1050.

Since the communication device 1000 is depicted for clarity of description, prescribed module(s) may be omitted in part. The communication device 1000 may further include necessary module(s). And, a prescribed module of the communication device 1000 may be divided into subdivided modules. A processor 1010 is configured to perform an operation according to the embodiments of the present invention illustrated with reference to drawings. In particular, the detailed operation of the processor 1010 may refer to the former contents described with reference to FIG. 1 to FIG. 9.

The memory 1020 is connected with the processor 1010 and stores an operating system, applications, program codes, data, and the like. The RF module 1030 is connected with the processor 1010 and then performs a function of converting a baseband signal to a radio signal or a function of converting a radio signal to a baseband signal. To this end, the RF module 1030 performs an analog conversion, amplification, a filtering, and a frequency up conversion, or performs processes inverse to the former processes. The display module 1040 is connected with the processor 1010 and displays various kinds of information. And, the display module 1040 can be implemented using such a well-known component as an LCD (liquid crystal display), an LED (light emitting diode), an OLED (organic light emitting diode) display and the like, by which the present invention may be non-limited. The user interface module 1050 is connected with the processor 1010 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the aforementioned method for multiplexing acknowledgement/negative acknowledgement (ACK/NACK) of a unicast signal and ACK/NACK of a multicast signal in a wireless communication system and the aforementioned apparatus therefor have been described based on the 3GPP LTE system, the method and the apparatus may be applied to various wireless communication systems in addition to the 3GPP LTE system.

The invention claimed is:
1. A method for a user equipment (UE) in a wireless communication system, the method comprising:
receiving a first physical downlink shared channel (PDSCH) based on a first downlink control information (DCI), wherein the first DCI comprises a first downlink assignment index (DAI) related to information regarding a first position of the first PDSCH in a first number of PDSCHs configured for a first multicast service for the UE; and transmitting acknowledgement/negative acknowledgement (ACK/NACK) information related to the first PDSCH based on the first DAI.

2. The method of claim 1, wherein the first DCI further comprises a first parameter related to one of a plurality of predetermined multicast services different from each other, and wherein the first PDSCH is received based on the first parameter related to the first multicast service.

3. The method of claim 2, further comprising receiving a second PDSCH based on a second DCI, wherein the second DCI comprises (i) a second DAI and (ii) a second parameter related to one of the plurality of predetermined multicast services, and wherein based on the second parameter related to the first multicast service:

the second DAI is related to information regarding a second position of the second PDSCH in the first number of PDSCHs, and the ACK/NACK information is obtained by bundling a bit related to ACK/NACK for the first PDSCH and a bit related to ACK/NACK for the second PDSCH based on the first DAI and the second DAI.

4. The method of claim 3, wherein based on the second parameter related to a second multicast service for the UE which is different from the first multicast service:

the second DAI is related to information regarding a third position of the second PDSCH in a second number of PDSCHs configured for the second multicast service, and the ACK/NACK information is obtained by bundling respectively performed for the first number of PDSCHs and the second number of PDSCHs based on the first DAI and the second DAI.

5. The method of claim 1, further comprising receiving a third PDSCH related to a unicast service, and wherein, in the ACK/NACK information, a bit related to ACK/NACK for the third PDSCH is prior to a bit related to ACK/NACK for the first PDSCH.

6. An apparatus in a wireless communication system, the apparatus comprising:

a memory; and at least one processor coupled with the memory, wherein the at least one processor is configured to:

receive a first physical downlink shared channel (PDSCH) based on a first downlink control information (DCI), wherein the first DCI comprises a first downlink assignment index (DAI) related to information regarding a first position of the first PDSCH in a first number of PDSCHs configured for a first multicast service for the apparatus; and transmit acknowledgement/negative acknowledgement (ACK/NACK) information related to the first PDSCH based on the first DAI.

7. A method for a base station (BS) in a wireless communication system, the method comprising:

transmitting a first physical downlink shared channel (PDSCH) based on a first downlink control information (DCI), wherein the first DCI comprises a first downlink assignment index (DAI) related to information regarding a first position of the first PDSCH in a first number of PDSCHs configured for a first multicast service for a user equipment (UE); and receiving, from the UE, acknowledgement/negative acknowledgement (ACK/NACK) information related to the first PDSCH based on the first DAI.

8. An apparatus in a wireless communication system, the apparatus comprising:

a memory; and at least one processor coupled with the memory, wherein the at least one processor is configured to:

transmit a first physical downlink shared channel (PDSCH) based on a first downlink control information (DCI), wherein the first DCI comprises a first downlink assignment index (DAI) related to information regarding a first position of the first PDSCH in a first number of PDSCHs configured for a first multicast service for a user equipment (UE); and receive, from the UE, acknowledgement/negative acknowledgement (ACK/NACK) information related to the first PDSCH based on the first DAI.

* * * * *